R. DUTTON.
Harvester.
No. 1,763.
Reissued Sept. 13, 1864.
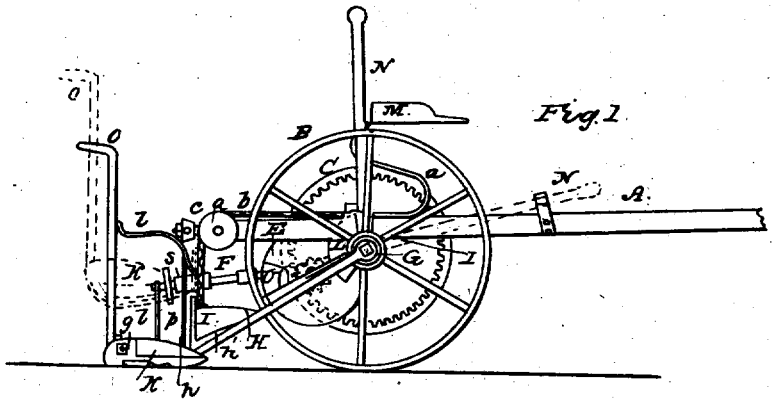
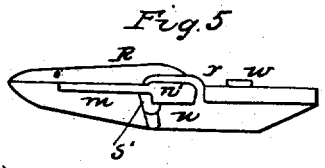
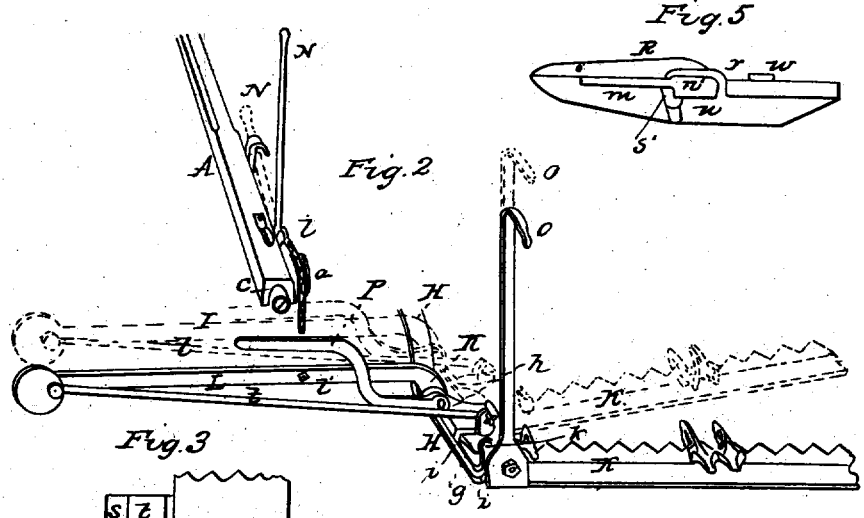
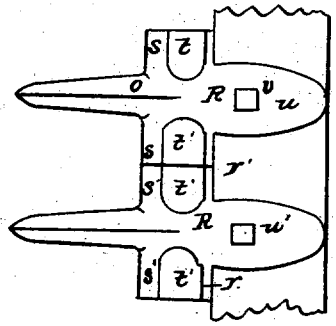
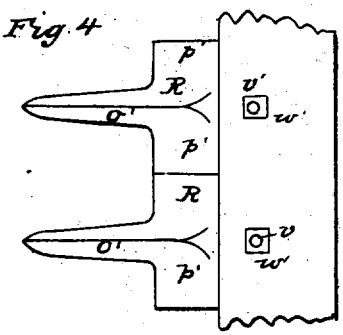
WITNESSES
L. D. Lea
Alex. C. Fanteroy
INVENTOR
R. Dutton
N. PETERS, Photo-Lithographer, Washington, D. C.

UNITED STATES PATENT OFFICE.

RUFUS DUTTON, OF BROOKLYN, NEW YORK.

IMPROVEMENT IN HARVESTERS.

Specification forming part of Letters Patent No. 31,705, dated March 19, 1861; Reissue No. 1,763, dated September 13, 1864.

*To all whom it may concern:*

Be it known that I, RUFUS DUTTON, of Brooklyn, Kings county, State of New York, formerly of Dayton, State of Ohio, have invented a new and useful Improvement in Mowing or Harvesting Machines; and I do hereby declare that the following is a full, clear, and exact description thereof, reference being had to the accompanying drawings, and to the letters of reference marked thereon, and making a part of this specification.

The nature of my invention consists in an improved arrangement for raising and lowering the finger-bar of a mowing-machine, so as to avoid or escape obstructions; and also in the application and use of an improved guard-finger.

Figure 1 is a side elevation of a machine. Fig. 2 is a rear perspective view, showing the cutter-bar in two positions. Fig. 3 is a bottom view of a portion of the finger-bar with guard-fingers attached. Fig. 4 is a plan view of the same. Fig. 5 is an end view of the same.

Like letters designate corresponding parts in all the figures.

In the drawings, A represents the tongue of the machine; B, one of the driving-wheels, the main or outer driving-wheels being of the same size with this, and at the other end of the axle G, on which they are mounted. The main driving-wheel C, which actuates the working parts of the machine, is situated close to the main or outer driving-wheel, and is coupled with such wheel by means of a pawl and ratchet, so arranged that as the machine is moved forward the driving-wheel and main gear-wheel are coupled together; but as the machine is moved backward they will be uncoupled. The construction of such pawl and ratchet is fully described and set forth in certain other reissued Letters Patent of even date herewith. The driving-wheel B is in like manner provided with a ratchet-recess, similar to that of the main driving-wheel, in which engages the pawl of a flange on the inner side of such wheel B, rigidly secured to the axle. It is desirable that the main or outer driving-wheel should do most of the work in driving the axle; but in turning corners, where such driving-wheel has not much motion, and in passing over inequalities of the ground, where such wheel might not have much traction, it is necessary to have the opposite wheel also coupled with the axle.

For the purpose of equalizing the draft of the machine, and for other purposes hereinafter mentioned, the main gear-wheel C and the secondary gearing that gives vibration to the cutter-bar are placed on the same side of the machine with and near the main driving-wheel. By this arrangement the gear-wheel, being situated at the extremity of the axle opposite the finger-bar, its weight, which is considerable, has a tendency to equalize the draft. Other advantages are also secured by placing such main gear-wheel in close proximity to the main driving-wheel and coupling them together, as described. When the gear-wheel is situated near the middle of the axle it is liable to strike obstructions in its path; but this objection is obviated to a great degree by placing it at one end. There is also considerable saving in the cost, for when the gear-wheel is situated away from the main driving-wheel a flange or its equivalent must be used to couple the main driving-wheel to the axle.

At a suitable position inside, but near the main gear-wheel C, there is secured to the axle G, by means of an eye or socket, the outer side, D, of the frame of the machine, and to the extremity of the axle, outside of the driving-wheel B, is secured the inner side, H, of the frame, the connection between the side and the axle being by an eye or socket, *r*, in which the axle turns. The sides D and H extend back and are connected by means of the back piece, I, of the frame, which piece I is to be sufficiently elevated to pass over the grass.

On the rear end of the plate or part D is a metallic piece, having bearings *s s* for the pitman or crank-shaft F, which connects by a beveled gear with the beveled wheel in the casing E, (the construction of which casing is fully described in the said other Letters Patent referred to,) and which receives motion from the main gear-wheel C, the two sides of which metallic piece are at right angles and fit to and rigidly brace the corners formed by the side D and the back piece, I, of the frame, the back piece, I, being bent around and bolted to the plate or part D, and also to such metallic piece. The opposite or inner end of the back I is curved or turned downward on the inner side, H, of the frame and rigidly secured thereto, as shown at $h'$. This back piece, I, is situated in front of the pitman-crank, protects it from obstructions, and avoids the necessity of shielding it. The inner side, H, of the frame extends behind the junction of the back piece, I, therewith and underneath the hinge-piece $i$ of the finger-bar, forming a draft-shoe, H', and the extremity thereof is turned up and forms a lug or ear, $z'$, to which a similar adjacent lug or ear, $k'$, of said hinge-piece $i$ is jointed by means of a pivot. A lug, $k$, on the opposite end of the hinge-piece is in like manner jointed by means of a pivot, $h$, to the back piece, I, of the frame. These two pivots are on a line with each other, so that the finger-bar K is easily folded over on the rear end of the frame, whenever it is desirable, for the purpose of convenience in taking the machine from place to place. For sustaining the finger-bar when thus folded over a support, $l$, extends from the plate or side D of the frame, to which it is bolted, as represented. By this arrangement, making the inner side, H, of the frame form the shoe of the finger-bar, resting on the ground, and hinging the finger-bar so as to allow its inner end to rise and fall, such finger-bar can adapt itself to the inequalities of the ground in mowing.

The finger-bar is raised, lowered, and controlled by the operator while sitting in the driver's seat M by the following arrangement: On the axle G, at a suitable position near the driver's seat M, is secured a grooved segment, L, turning on said axle, and having a socket, into which fits the end of a lever or handle, N, extending upward, so as to be conveniently operated by the driver. The segment L may, however, be dispensed with, and the lever N be supported directly on the shaft. In the upper portion of the groove of this segment, or to the lever N, is attached the end of a cord or chain, $b$, passing backward over a pulley, $a$, secured to the tongue A, and extending thence downward and fastened to the back I of the frame by an eyebolt, $l'$. In the place of the pulley $a$ an arm, pivoted at one end and moving on such pivot, may be made use of, and in machines having a fixed tongue such pulley or arm may be fixed to any part of the frame instead of to the tongue. By this arrangement, when the handle N is thrown forward and the finger-bar folded over the rear end of the frame, including the finger-bar, is raised sufficiently from the ground to allow the machine to be transported from place to place. To hold the lever N in position when thus thrown forward, I usually employ a hook, $n$, secured to the tongue; and in order to catch the lever under the hook and to detach it therefrom, the segment L is allowed a little lateral movement. At the proper position on the tongue I also secure a stop, for the purpose of preventing the lever N from falling over when in an upright position. By supporting the lever N upon or near the axle of the machine, it is particularly convenient for operation by the driver, and can be quickly and easily controlled by him when in his seat and equally well whether the sickle is behind or before the driving-wheels, it only being necessary to move such lever in an opposite direction, according as the cutters are before or behind. The main shaft of the machine furnishes, also, a strong and staple-support for such lever.

If the finger-bar were extended as when in operation, and the rear end of the frame were raised, as described above, by means of the lever N, segment L, and cord or chain $b$, it is apparent (the finger-bar being hinged at $g$ and $h$) that the outer end of said finger-bar would not be raised, but would still rest on the ground, while the draft-shoe H would be elevated. To raise the outer end of the finger-bar at the same time that the draft-shoe is raised, and also to raise it still higher than said draft-shoe, when necessary, I make use of the following arrangement: On the pivot $h$ of the hinge-piece $i$ is supported or fixed the end of a lever, P, said lever being allowed to turn freely toward the finger-bar, but prevented from turning independently in the opposite direction by striking against the hinge-piece $i$. This lever is bent upward to give it sufficient elevation, and is then turned inward, extending somewhat beyond the end of the tongue A, as represented in Fig. 2. On the rear end of the tongue, or on some part of the frame directly over this lever, is situated a horizontal friction-roller, $c$, or its equivalent, against which, when the rear end of the frame is raised by the action of the lever N, the said lever P strikes and is pressed down, causing the hinge-piece $i$ to be turned inward, thereby elevating the outer end of the finger-bar. By such construction of the lever P, or of its manner of connection with the heel of the cutter-bar, while it has motion freely toward the cutter-bar, it becomes, when turned in the opposite direction, a prolongation of such finger-bar. The finger-bar is thus raised, lowered, and controlled by the driver without trouble. Instead, however, of having the lever P turn upon the same pivot, forming the hinge of the finger-bar, such lever may be fixed to the heel or shoe of such bar at or near such joint, and its action will be same. Instead, also, of the use of the roller $c$, against which the lever P shall strike as the back part of the frame or shoe is elevated, such lever P may be connected to the frame or tongue by a link or bar hinged to the frame or pole, and also to the lever, so that the end of such link or bar connected to the lever can move in a lateral direction as such lever is raised or depressed.

When the finger-bar is set up or folded onto the machine the hinge-piece $i$ is reversed or turned bottom side up, and then the lever P, having no bearing thereon, drops down and rests on the end of the eyebolt $l'$ of the back I.

In order to allow the operator to walk behind the machine whenever desirable, and at the same time have perfect control of the finger-bar, an upright handle, O, Figs. 1 and 2, of sufficient height for the purpose designed, is secured in any convenient manner to the rear end of the draft-shoe H. In raising this handle the outer end of the finger-bar is elevated by means of the bent lever P and friction-roller *c*, or their equivalents, in the same manner as by operating the handle N of the segment L, as above described, and the effect is the same.

My improved guard-finger R is made in a single piece of such shape as to allow the best action of the sickle-bar working therein to attach strongly and firmly to the finger-bar to avoid clogging or choking, and at the same time to give the greatest amount of strength with the least amount of metal. The slot *m'* and passage *n'* for the reception, respectively, of the sickle and sickle-bar are substantially of the form shown in the end view, Fig. 5, the passage *n'* being of such size as to leave sufficient space over the top and at the back of the sickle-bar when working therein to allow the free escape of grass and other matter that enters. The finger *o'* is of the usual shape; but the rear upper portions, *p' p'*, of the guard extend outward laterally a sufficient distance from the finger to meet the similar adjacent portions of the contiguous guard-fingers, thereby forming a complete surface and a covering for the sickle-bar. The rear edge of the guard turns over at right angles, as shown at *r'*, Figs. 3 and 5, thereby forming a plane bearing-surface against the finger-bar K, and extending the whole width of the guard. The front portions, *s' s'*, of the guard below the sickle-slot, and corresponding with the front edge of the portions *p' p'* above, extend likewise outward from the finger an equal distance with said portions *p' p'*, and serve as a shield to protect the sickle-bar. A portion, *t'*, under the sickle-bar, on each side of the finger-guard, is cut away, as shown in the bottom view, Fig. 3, for the purpose of allowing the free escape of the grass or other substance tending to clog the sickle. The rear bottom portion, *u'*, of the guard, substantially of the form shown in Figs. 3 and 5, extends back nearly or quite to the rear edge of the finger-bar, and forms a bearing-surface against the bottom of said finger-bar, to which it is secured by means of a bolt, *v'*, on the upper end of which screws a nut, *w'*. The upper surface, *p' p'*, of the guard entirely covering the sickle-bar prevents the cut grass or any other substance from coming in contact therewith, and being drawn under the fingers and causing it to choke or clog. The rear upper portion of the guard, being raised higher than the finger-bar and the nuts *w' w'*, prevents the said finger-bar and nuts from obstructing the mown grass in its passage over them. The portions *r'*, by forming a plane bearing-surface its entire length against the edge of the finger-bar, prevents any lateral movement of the finger, and makes necessary but a single small bolt, *v'*, to hold the guard-finger firmly in its place. The guard-finger is much stronger than the ordinary open guard-finger, and its under side may be made lighter, the upper portions, *p' p'*, having a large surface and extending round, as shown at *r'*, and forming a portion of the guard as a whole, thereby bracing and sustaining it against all lateral strain.

What I claim as my invention, and desire to secure by Letters Patent, is—

1. Raising the outer end of the finger-bar of harvesters having a flexible finger-bar by means of a lever supported on the same joints with the finger-bar or on the shoe or heel of such bar at or near such joints and turning freely toward the finger-bar, but rigid with it when turned in an opposite direction, by causing such lever when the heel of the finger-bar is raised to be brought in contact with the pole or the frame of the machine or a projection therefrom, so as to press or force down such lever, and thereby raise the outer end of the finger-bar, substantially as set forth.

2. I do not claim forming a guard-finger in a single piece, nor do I claim forming it in such a manner as to cover the sickle-bar and leave openings in its under side for the escape of grass and other substances, as I am aware that such a device has been known; but I claim a guard-finger made in a single piece, covering the sickle-bar, and having openings in the bottom for the escape of grass and other substance entering with the sickle when said guard-finger is provided with a bearing-surface, as *r'*, connecting the upper and lower portions of said guard-finger and resting against the edge of the finger-bar, and is braced and sustained against lateral strain, as herein set forth.

R. DUTTON.

Witnesses:
S. D. LAW,
ALONZO C. FARNHAM.